United States Patent
Li et al.

(10) Patent No.: US 10,177,972 B2
(45) Date of Patent: Jan. 8, 2019

(54) METHODS, WIRELESS DEVICE AND NETWORK NODE FOR HANDLING SIGNAL MEASUREMENTS IN A DYNAMIC TDD SCENARIO

(71) Applicant: Telefonaktiebolaget LM Ericsson (publ), Stockholm (SE)

(72) Inventors: Shaohua Li, Beijing (CN); Rui Fan, Beijing (CN); Zhiheng Guo, Beijing (CN); Jinhua Liu, Beijing (CN); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 54 days.

(21) Appl. No.: 15/024,083

(22) PCT Filed: Jun. 25, 2014

(86) PCT No.: PCT/SE2014/050789
§ 371 (c)(1),
(2) Date: Mar. 23, 2016

(87) PCT Pub. No.: WO2015/047153
PCT Pub. Date: Apr. 2, 2015

(65) Prior Publication Data
US 2016/0241434 A1   Aug. 18, 2016

(30) Foreign Application Priority Data

Sep. 27, 2013   (WO) ................ PCT/CN2013/084424

(51) Int. Cl.
*H04W 4/00*   (2018.01)
*H04L 12/24*   (2006.01)
(Continued)

(52) U.S. Cl.
CPC ....... *H04L 41/0803* (2013.01); *H04B 7/2656* (2013.01); *H04L 5/14* (2013.01);
(Continued)

(58) Field of Classification Search
CPC ......... H04W 24/20; H04W 72/02; H04B 7/02
(Continued)

(56) References Cited

U.S. PATENT DOCUMENTS

| 2015/0043469 | A1* | 2/2015 | Kim | ................... | H04B 7/26 370/329 |
| 2015/0250017 | A1* | 9/2015 | Ingale | ................. | H04B 7/2615 370/280 |
| 2016/0050575 | A1* | 2/2016 | Seo | ...................... | H04W 72/04 370/252 |

FOREIGN PATENT DOCUMENTS

WO    2012167431 A1    12/2012

OTHER PUBLICATIONS

3GPP, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management ( . . . )", 3GPP TR 36.828 V11.0.0, Release 11, Jun. 2012, 1-109.

(Continued)

*Primary Examiner* — Iqbal Zaidi
(74) *Attorney, Agent, or Firm* — Murphy, Bilak & Homiller, PLLC (57) ABSTRACT

Method and wireless device (500) for handling Channel State Information, CSI, measurements when operating in a wireless network in a dynamic Time Division Duplex, TDD, scenario where a network node (502) serving the wireless device (500) can switch between different up-link-downlink configurations comprising flexible subframes which can be uplink or downlink. When the wireless device (500) deter- (Continued)

mines (5:2) that a link direction of at least one of the flexible subframes is ambiguous, the wireless device (500) indicates (5:5) to the serving network node (502) that the wireless device (500) has not made a valid CSI measurement due to the ambiguous link direction. Then, the network node (502) re-uses (5:6) a CSI measurement from a CSI report previously received from the wireless device (500), e.g. for link adaptation.

10 Claims, 5 Drawing Sheets

(51) Int. Cl.
    *H04B 7/26*    (2006.01)
    *H04L 5/14*    (2006.01)
    *H04W 24/08*   (2009.01)
    *H04W 72/04*   (2009.01)
    *H04L 5/00*    (2006.01)
    *H04W 88/08*   (2009.01)

(52) U.S. Cl.
    CPC ......... *H04W 24/08* (2013.01); *H04W 72/042* (2013.01); *H04W 72/0413* (2013.01); *H04W 72/0446* (2013.01); *H04L 5/0048* (2013.01); *H04L 5/1469* (2013.01); *H04W 88/08* (2013.01)

(58) Field of Classification Search
    USPC .................................................. 370/252–339
    See application file for complete search history.

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

Unknown, Author, "Details of Signalling for TDD UL-DL Reconfiguration", 3GPP TSG RAN WG1 Meeting #74bis R1-134314, ZTE, Guangzhou, China, Oct. 7-11, 2013, 1-5.

Unknown, Author, "On CSI enhancements for Dynamic TDD", 3GPP TSG-RAN WG1 #72bis R1-131456, Ericsson, Chicago, U.S.A., Apr. 15-19, 2013, 1-3.

Unknown, Author, "On CSI measurements for eIMTA", 3GPP TSG-RAN WG1 Meeting #73 R1-132296, Nokia Siemens Networks, Nokia, Fukuoka, Japan, May 20-24, 2013, 1-2.

* cited by examiner

METHODS, WIRELESS DEVICE AND NETWORK NODE FOR HANDLING SIGNAL MEASUREMENTS IN A DYNAMIC TDD SCENARIO

TECHNICAL FIELD

The present disclosure relates generally to a wireless device, a network node and methods therein for handling Channel State Information, CSI, measurements in a dynamic Time Division Duplex, TDD, scenario where the network node is serving the wireless device and can switch between different uplink-downlink configurations comprising flexible subframes which can be uplink or downlink.

BACKGROUND

In the field of wireless communication, the terms "User Equipment, UE" and "wireless device" are commonly used for various communication entities e.g. including mobile telephones, tablets and laptop computers. In this disclosure, "wireless device" will be used to represent any wireless communication entity capable of communicating radio signals with a wireless network. It should be noted that a wireless device in this context may also be a Machine Type Communication, MTC, device such as a sensor, counter or measuring device arranged to operate automatically and send reports or other messages to some central node.

Further, the term "network node" represents any node of a wireless network that is arranged to communicate radio signals with wireless devices. Throughout this disclosure, the term network node is interchangeable with base station, transmission point, radio node, eNodeB or eNB, and the term wireless device is interchangeable with UE.

Long Term Evolution, LTE, is a mobile broadband wireless communication technology defined by the third Generation Partnership Project, 3GPP. According to LTE, radio signals are transmitted from network nodes (referred to as eNodeBs or eNBs by 3GPP) to wireless devices (referred to as UEs by 3GPP) over a radio link using Orthogonal Frequency-Division Multiplexing, OFDM. In a wireless network, a Time Division Duplex, TDD, configuration of subframes, also known as "uplink-downlink configuration", may be used for uplink and downlink transmissions in cells where consecutive subframes are comprised in a repeatable radio frame.

Figure 1:
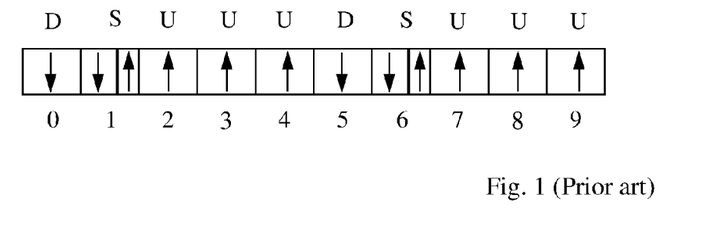
FIG. 1 is a diagram of subframes illustrating an example of an UL-DL configuration, according to the prior art.

In a TDD scenario, the subframes of a particular frequency are reserved for either uplink transmissions from wireless devices to a serving network node or downlink transmissions from the network node to the wireless devices such that uplink and downlink transmissions do not occur at the same time on the same frequency within the cell. A subframe is basically defined by a preset time period of a certain length, typically 1 millisecond (ms), and each subframe may comprise two time slots of 0.5 ms each. Further, a radio frame comprises a predefined number of consecutive subframes, e.g. ten subframes. In such a network, different network nodes are able to use different uplink-downlink, UL-DL, configurations of subframes, e.g. depending on the current need for uplink and downlink bandwidth resources. An example of a downlink-uplink configuration of subframes is shown in FIG. 1 including downlink subframes "D", uplink subframes "U" and so-called special subframes "S". The special subframes S are configured with one part reserved for downlink, another part reserved for uplink, and a guard period with no transmission between the above two parts, thus allowing neither uplink nor downlink in the guard period.

Figure 2:
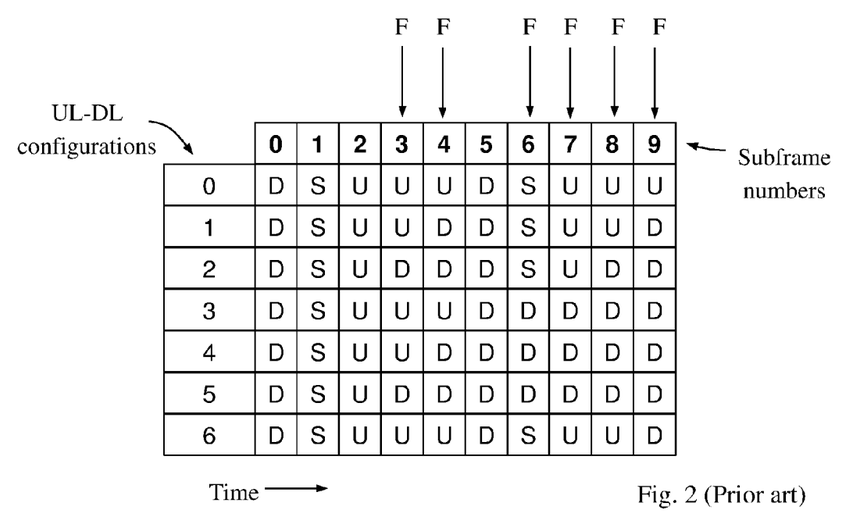
FIG. 2 is a table illustrating some typical UL-DL configurations that may be used by different network nodes in a wireless network, according to the prior art.

A set of different UL-DL configurations that can be used by network nodes in different radio frames is shown in the table of FIG. 2 comprising seven different UL-DL configurations 0-6 each having ten subframes 0-9 of a repeatable radio frame It can be seen in this example that the first three subframes 0-2 and subframe 5 are reserved for downlink D, special S, uplink U, and downlink D, respectively, in all UL-DL configurations 0-6, while the remaining subframes 3, 4, 6-9 can vary in different UL-DL configurations. The latter subframes 3, 4, 6-9 may thus be referred to as flexible subframes, indicated by "F" in the figure.

In this disclosure, the term "flexible subframe" denotes a subframe in which the direction of transmission, i.e. downlink or uplink, may differ between different cells so that the flexible subframe may be used for downlink in one cell and for uplink in another cell. Further, a flexible subframe may differ from one radio frame to another radio frame in the same cell, so that the flexible subframe may be used in the cell for downlink in one radio frame and for uplink in another radio frame, e.g. depending on the instantaneous traffic demands. Thereby, the link direction of transmissions in flexible subframes over a radio link between a wireless device and a serving network node is not obviously predictable and some amount of signaling is needed to indicate the current direction of a flexible subframe to the served wireless devices. This is commonly referred to as a dynamic TDD scenario.

The network node thus signals the current UL-DL configuration in a suitable manner to any wireless device(s) currently being served by the network node, e.g. in broadcasted system information contained in a System Information Block, SIB, which any wireless device may read, and/or in dedicated signaling, such as Radio Resource Control, RRC, signaling, which is exclusively directed to specific wireless devices which are capable of operating in such a dynamic TDD scenario. The signaling may be done on a per radio frame basis which enables the wireless device to determine in which subframe(s) of the current radio frame it is possible to perform Channel State Information, CSI, measurement of reference signals transmitted by the network node, which is obviously not possible to do in an unsuitable subframe that is configured for uplink transmission according to a current UL-DL configuration. A CSI reference signal is denoted "CSI-RS" which can be transmitted by the network node in a downlink subframe, and the wireless device is then able to perform CSI measurement on the CSI-RS transmitted in that subframe and determine a Channel Quality Information, CQI, value which indicates the quality of the radio link used. The wireless device also reports a specific Channel Quality Information, CQI, value in a CSI reporting subframe to the serving network node, which enables the network node to perform link adaptation based on the CSI report, among other things.

However, it may be a problem that a wireless device is sometimes not able to know which UL-DL configuration is currently used in a particular radio frame, such as when the wireless device has not successfully detected the signaled UL-DL configuration. Consequently, the wireless device may perform CSI measurement in unsuitable subframes which may have changed direction without the wireless device noticing due to missed signaling, which in turn may result in irrelevant and misleading CSI reports and deficient evaluation of channel quality e.g. for the purpose of performing link adaptation in the network node.

SUMMARY

It is an object of embodiments described herein to address at least some of the problems and issues outlined above. It is possible to achieve this object and others by using a wireless device, a network node and methods therein as defined in the attached independent claims.

According to one aspect, a method is performed by a wireless device for handling Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink. In this method, the wireless device determines that a link direction of at least one of the flexible subframes is ambiguous, and indicates to the serving network node that the wireless device has not made a valid CSI measurement due to the ambiguous link direction.

According to another aspect, a wireless device is capable of handling CSI measurements when operating in a wireless network in a dynamic TDD scenario where a network node serving the wireless device can switch between different uplink-downlink configurations comprising flexible subframes which can be uplink or downlink. The wireless device comprises means, e.g. a determining module, configured to determine that a link direction of at least one of the flexible subframes is ambiguous. The wireless device also comprises means, e.g. an indicating module, configured to indicate to the serving network node that the wireless device has not made a valid CSI measurement due to the ambiguous link direction.

According to another aspect, a method is performed by a network node in a wireless network, for handling CSI measurements by a wireless device served by the network node in a dynamic TDD scenario where the network node can switch between different uplink-downlink configurations comprising flexible subframes which can be uplink or downlink. In this method, the network node receives an indication from the wireless device indicating that the wireless device has not made a valid CSI measurement due to ambiguous link direction of at least one of the flexible subframes. The network node further re-uses a CSI measurement from a CSI report previously received from the wireless device, e.g. for performing link adaptation.

According to another aspect, a network node in a wireless network is capable of handling CSI measurements by a wireless device served by the network node in a dynamic TDD scenario where the network node can switch between different uplink-downlink configurations comprising flexible subframes which can be uplink or downlink. The network node comprises means, e.g. a receiving module, configured to receive an indication from the wireless device indicating that the wireless device has not made a valid CSI measurement due to ambiguous link direction of at least one of the flexible subframes. The network node also comprises means, e.g. a using module, configured to re-use a CSI measurement from a CSI report previously received from the wireless device, e.g. for performing link adaptation.

When using any of the above methods and nodes, it can be ensured that CSI measurements made by the wireless device can be handled in a useful manner when the wireless device operates in a dynamic TDD scenario, by avoiding any irrelevant and misleading CSI report from the wireless device to the network node. In particular, it can be avoided that the wireless device reports a CSI measurement which has mistakenly been made on an uplink subframe when the wireless device has missed a current uplink-downlink configuration signaled by the serving network node.

A computer program is also provided comprising instructions which, when executed on at least one processor, cause the at least one processor to carry out either of the above methods. A carrier is also provided which contains the above computer program, wherein the carrier is one of an electronic signal, optical signal, radio signal, or computer readable storage medium.

The above wireless device, network node and methods therein may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to ensure that a wireless device handles Channel State Information, CSI, measurements in a useful manner when operating in a wireless network in a dynamic TDD scenario, where a network node serving the wireless device in a cell can switch between different uplink-downlink configurations of a radio frame comprising flexible subframes which can be uplink or downlink.

In dynamic TDD, in case the explicit uplink-downlink configuration signaling is missed by the wireless device, there will be ambiguity for CSI-RS usage and determination of a so-called CSI reference resource which is defined as follows. In the frequency domain, the CSI reference resource is defined by a group of downlink physical resource blocks corresponding to a band to which a derived CQI value relates. In the time domain, the CSI reference resource is defined by a single downlink subframe $n-n_{CQI\_ref}$ where n is reported uplink subframe, i.e. the subframe in which the device should send a CSI report, and $n_{CQI\_ref}$ is defined in 3GPP document 36.213. For example, $n_{CQI\_ref}$ may be the smallest value greater than or equal to a predefined reference number, e.g., 4, such that it corresponds to a valid downlink subframe. In this description, a downlink subframe in a serving cell can only be considered to be "valid" to the wireless device if it is configured as a downlink subframe for the wireless device according to the signaled uplink-downlink configuration.

In this solution it has been realized that when dynamic TDD is used, it is necessary that the wireless device knows which uplink-downlink configuration is currently used in order to ensure that a valid CSI report based on a correct CSI reference resource is sent to the serving network node. The wireless device should thus not perform CSI measurement in "unsuitable" subframes, i.e. subframes where no reference signal is transmitted from the serving network node, and no such deceptive CSI measurement should be reported to the serving network node. This is particularly relevant for the wireless device to know for flexible subframes in which the direction of transmission, i.e. the link direction, may change depending on which uplink-downlink configuration is currently used.

As mentioned above, one or more flexible subframes may have changed direction without the wireless device noticing due to missed signaling, thus making the link direction ambiguous. Therefore, it is suggested in this solution that the wireless device should not report any CSI measurement for a CSI reference signal, CSI-RS, configured in a subframe with ambiguous link direction to the serving network node using wrong CSI-RS resource, e.g. when the signaling has been missed, to avoid the risk that the CSI measurement might be mistakenly made on an uplink subframe, which would result in an irrelevant and misleading CSI report for that CSI measurement. It is customary that the network node signals the current uplink-downlink configuration according to a pattern that is known to any wireless devices served by the network node. Since the pattern used by the network node for sending explicit signaling is known to the wireless device, the wireless device is able to detect that such an explicit signaling has been missed.

First, a conventional procedure of how a wireless device provides CSI reports to a network node will be described with reference to the signaling diagram of FIG. 3. In this diagram, a wireless device 300 is being served by network node 302 over a radio link, which means that the network node 302 typically signals various information to the wireless device 300 to enable proper operation of the wireless device 300. In particular, the network node 302 signals a currently valid uplink-downlink, UL-DL, configuration to the wireless device 300 as shown in an action 3:1.

When dynamic TDD is applied, the network node 302 may signal a new uplink-downlink configuration to the wireless device 300 at any time, that is within the above-mentioned know pattern for explicit signaling, such that a new uplink-downlink configuration may be applied even on a radio frame basis. The signaled uplink-downlink configuration indicates which subframes within one or more following radio frames are configured for uplink transmission and which subframes are configured for downlink transmission. The network node 302 may also signal, not shown, to inform the wireless device 300 about which subframes comprise a CSI Reference Signal, and about which subframes form a CSI subframe set, which can thereby be subjected to CSI measurement if they are downlink subframes according to the signaled uplink-downlink configuration. The CSI subframes may also be signaled as two separate CSI subframe subsets, one for CSI measurement of flexible subframes and one for CSI measurement of fixed subframes, which are linked to separate CSI reports, which will be further discussed later below.

Thus, in a following action 3:2, the network node 302 includes a CSI reference signal denoted "CSI-RS" in a downlink subframe transmission, and the wireless device 300 is able to perform CSI measurement on that CSI reference signal. In other words, the subframe which includes the CSI reference signal is a suitable subframe for CSI measurement, while any flexible subframe that is configured for uplink transmission in the signaled uplink-downlink configuration is an unsuitable subframe which will accordingly not be used by the wireless device 300 for CSI measurement. Another action 3:3 illustrates that the wireless device 300 sends the CSI measurement in a CSI report to the network node 302 which is then able to perform link adaptation, among other things, based on the reported CSI measurement, in a final shown action 3:4.

However, it may happen that the wireless device 300 actually misses the uplink-downlink configuration signaled in action 3:1, for whatever reason, such that the network node 302 starts to apply a new uplink-downlink configuration which is unknown to the wireless device 300. For example, the wireless device 300 may receive the uplink-downlink configuration in action 3:1 with much disturbing interference from another nearby transmission, or not at all due to bad radio coverage, or the wireless device 300 may not be able to decode the received signal correctly, and so forth. In either case, the correct uplink-downlink configuration is missed by the wireless device 300, and it may therefore act as described below to notify the network node 302.

A procedure for handling CSI measurements when a wireless device does not correctly perceive an uplink-downlink configuration signaled by a network node, will now be described with reference to the flow chart in FIG. 3. In this procedure, it is assumed that the wireless device is operating in a wireless network in a dynamic TDD scenario where the network node is serving the wireless device, and also that the network node can switch between different uplink-downlink configurations comprising flexible subframes which can be uplink or downlink. This procedure involves actions 400-404 that can be performed by the wireless device as well as actions 406-408 that can be performed by the network node. Some possible but non-limiting embodiments that may be used in this procedure will also be described below.

In a first shown action 400, the wireless device determines that a link direction of at least one of the flexible subframes is ambiguous. In an embodiment, the wireless device may determine the ambiguous link direction of at least one of the flexible subframes when missing the current uplink-downlink configuration as signaled by the serving network node, e.g. due to interference, bad radio coverage, and/or failed decoding. As mentioned above, the network node signals the current uplink-downlink configuration according to a known pattern which enables the wireless device to decide whether this signaling is received and the uplink-downlink configuration is detected, or missed such that the uplink-downlink configuration is not detected.

The current uplink-downlink configuration may be signaled by the network node in different ways. For example, the current uplink-downlink configuration maybe signaled by the serving network node in group common explicit signaling. The uplink reference configuration is signaled by a broadcasted SIB message, and the downlink reference configuration is signaled by dedicated RRC signaling. In another embodiment, when the current uplink-downlink configuration is signaled by the serving network node in group common explicit signaling, the wireless device may determine the ambiguous link direction when missing the group common explicit signaling.

An optional action 402 illustrates that the wireless device may drop or skip CSI measurement on a CSI reference signal, CSI-RS, configured in a subframe with ambiguous link direction. Thus, the wireless device may still perform CSI measurement based on the assumed CSI-RS in such a subframe, e.g. according to a previous CSI reference resource, and then drop it without including it in a CSI report to the serving network node since there is a risk that such a CSI report would be invalid. Alternatively, the wireless device may refrain from performing CSI measurement based on such a CSI-RS altogether. In either case, it can be said that no valid CSI measurement is made due to the ambiguous link direction.

Action 402 may be performed only if the following algorithm with four conditions is fulfilled:
The wireless device misses the explicit UL-DL configuration signaling (Condition 1), and
There exists a subframe with ambiguous link direction within a CSI subframe subset corresponding to a CSI report (Condition 2), and
The ambiguous link direction of the subframe leads to different understanding of the CSI reference resource for the wireless device and for the serving network node (Condition 3), or
Possible wrong CSI-RS usage (Condition 4), which means that the CSI-RS is configured in a subframe with ambiguous link direction.

In a further action 404, the wireless device also indicates to the serving network node that the wireless device has not made a valid CSI measurement due to the ambiguous link direction. This can be made according to different alternatives as follows. In an embodiment, the wireless device may indicate no valid CSI measurement by not reporting any measurement in a CSI reporting subframe corresponding to the at least one related subframe with ambiguous link direction to the serving network node. It is customary that the wireless device is configured to perform CSI measurement in a particular subframe, e.g. of each repeated radio frame, and to send a CSI report in a specific CSI reporting subframe that corresponds to the particular subframe in which the measurement was made. Alternatively, the wireless device may have been preconfigured to perform and report CSI measurement in this way. According to this embodiment, the wireless device does not send a CSI report in the CSI reporting subframe as expected, thus implicitly indicating no valid CSI measurement.

In another embodiment, the wireless device may indicate no valid CSI measurement by reporting a specific Channel Quality Information, CQI, value in a CSI reporting subframe. Thus, such a specific CQI value may have been reserved to indicate that no valid CSI measurement has been made while other CQI values can indicate different values of valid CSI measurements when performed according to normal behavior, i.e. in case the wireless device has managed to receive and decode the current uplink-downlink configuration correctly. In further embodiments, the specific CQI value mentioned above may be a predefined CQI index, such as CQI index 0, indicating no valid CSI measurement, while a CQI index other than 0 can be used to indicate the value of a valid CSI measurement when performed by the wireless device.

In another embodiment, the wireless device may indicate no valid CSI measurement to the serving network node when determining that a CSI Reference Signal, RS, is configured in the at least one subframe with ambiguous link direction. It is customary that the serving network node may signal to its served wireless devices to indicate in which subframes the CSI Reference Signal will be transmitted from the network node. If the subframes in which the CSI Reference Signal will be transmitted include a flexible subframe with ambiguous link direction, the wireless device may drop or skip CSI measurement in that subframe and instead indicate no valid CSI measurement to the serving network node due to ambiguous link direction.

It is further customary that the serving network node may signal one or more sets of so-called "CSI subframes" to the wireless device, which means that the subframes in such a set include a CSI Reference Signal which can be measured by wireless devices. In another embodiment, when a first set of CSI subframes, being linked to a CSI report 1, is configured for CSI measurement in flexible subframes and a second set of CSI subframes, being linked to a CSI report 2, is configured for CSI measurement in fixed subframes, the wireless device may indicate no valid CSI measurement for the first set of CSI subframes to the serving network node since the first set of CSI subframes comprises flexible subframes with ambiguous link direction.

On the other hand, within the second CSI subframe set linked to CSI report 2, there is no subframe whose link direction is ambiguous for the wireless device, even though the explicit UL-DL configuration signaling has been missed by the wireless device. Since the link direction for all the subframes within the subframe subset linked to the CSI report 2 are clear for the wireless device, it will use the same CSI reference resource for CSI derivation as the network node and it is thus not likely to have wrong CSI-RS usage. Therefore, for CSI report 2, normal CSI feedback may be performed by the wireless device even though the explicit UL-DL configuration signaling has been missed. Some examples of how the above embodiments can be used will be described in more detail later below with reference to FIGS. 7 and 8.

Returning to FIG. 4, the next action 406 is performed by the serving network node which receives an indication, made by the wireless device in action 404 e.g. according to any of the example embodiments described above, which thus indicates that the wireless device has not made a valid CSI measurement due to the ambiguous link direction of at least one of the flexible subframes. "Receiving" this indication may be done by just detecting that the wireless device 600 has not sent a CSI report as expected, as in one of the above-described embodiments of action 404, which is effectively an implicit indication of no valid CSI measurement. Another action 408 illustrates that the network node re-uses a CSI measurement from a CSI report previously received from the wireless device. The network node may further adjust transmission of the group common explicit signaling, which is however outside the scope of this solution. It may thus be assumed that the CSI measurement in the previous CSI report may still be useful provided that the link conditions have not changed much since, provided that the previous CSI report is not too old and outdated.

In an example embodiment, the network node may re-use the previously received CSI measurement for link adaptation. As such, link adaptation is a well-known procedure in this field which basically involves adjustment of various operational parameters and settings based on CSI measurements from the wireless device, so as to optimize the radio communication between the wireless device and the serving network node e.g. in terms of signal quality and/or network capacity. Since link adaptation is well-known in this field, it is not necessary to describe here in any detail.

Figure 5:
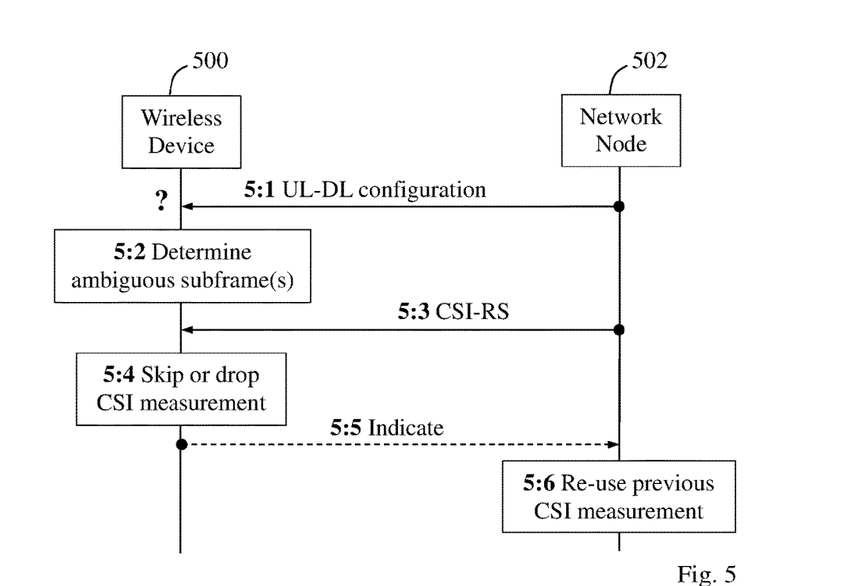
FIG. 5 is a signaling diagram illustrating how a wireless device handles CSI measurements when being served by a network node, according to further possible embodiments.

An example of how a signaling procedure may be executed when the solution is used in a dynamic TDD scenario, will now be described with reference to the diagram in FIG. 5. This example involves a wireless device 500 and a network node 502 which is serving the wireless device 500 in a cell, wherein the network node 502 can switch between different uplink-downlink configurations comprising flexible subframes which can be uplink or downlink. It was mentioned above that dynamic TDD enables the network node 502 to adjust the balance of uplink and downlink capacity depending on the current traffic demands, by applying an optimal uplink-downlink configuration to suite the current need for radio bandwidth capacity.

Figure 3:
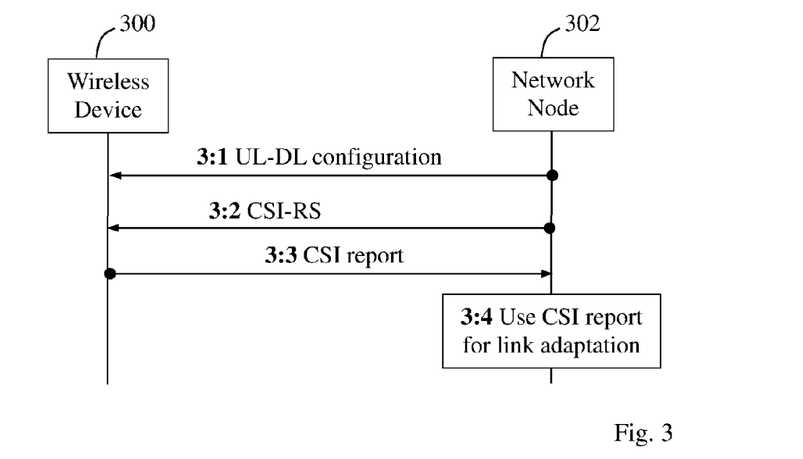
FIG. 3 is a signaling diagram illustrating that a wireless device provides CSI reports to a network node in a conventional manner.
Figure 4:
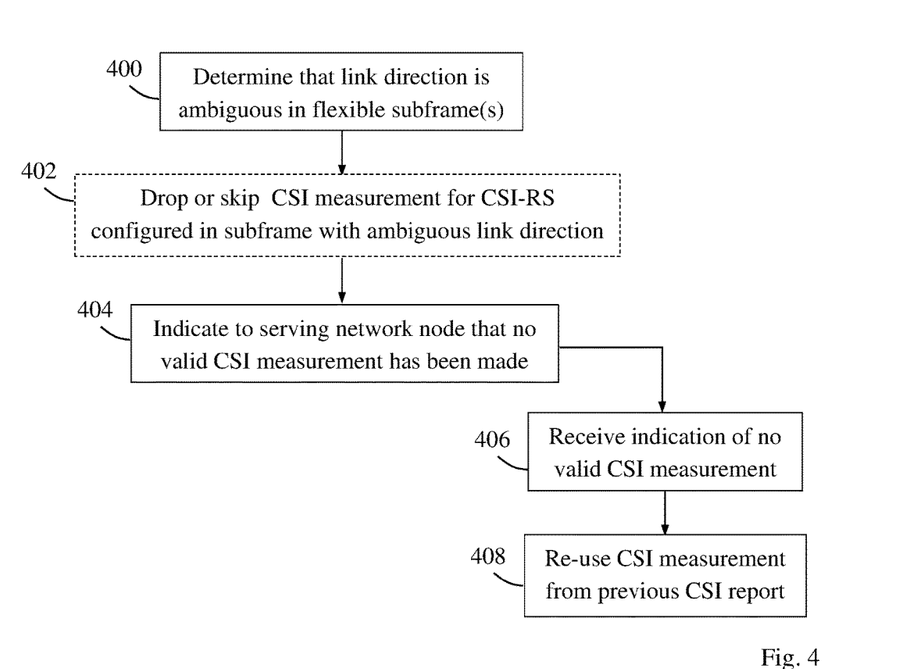
FIG. 4 is a flow chart illustrating procedures in a wireless device and in a network node for handling CSI measurements, according to some possible embodiments.

As in the procedure shown in FIG. 3, the network node 502 signals a currently valid uplink-downlink configuration to the wireless device 500 in a first shown action 5:1. However, the wireless device 500 is not able to receive and decode the signaled uplink-downlink configuration correctly, which is schematically indicated by a question mark. Another action 5:2 therefore shows that the wireless device 500 determines that a link direction of at least one of the flexible subframes is ambiguous due to the missed uplink-downlink configuration, which has also been described for action 400 above.

In a following action 5:3, the network node 502 includes a CSI reference signal CSI-RS in a downlink transmission in one of the at least one flexible subframes, but the wireless device 300 is not able to perform a valid CSI measurement of the CSI reference signal due to the ambiguous link direction of that flexible subframe. The wireless device 300 therefore skips or drops CSI measurement for the CSI-RS configured in in the ambiguous subframe, in another action 5:4.

The wireless device 500 also indicates to the serving network node 502 that the wireless device 500 has not made a valid CSI measurement in the ambiguous subframe of action 5:3, as schematically indicated by an action 5:5, which may be executed according to any of the examples which have been described above in connection with action 404. As already explained, this indication may be explicit by sending a CSI report with a specific CQI value, or implicit by not sending a CSI report as expected. A final action 5:6 shows that the network node 502 re-uses a CSI measurement from a CSI report previously received from the wireless device 500, e.g. for link adaptation, which has been described above for action 408.

Figure 6:
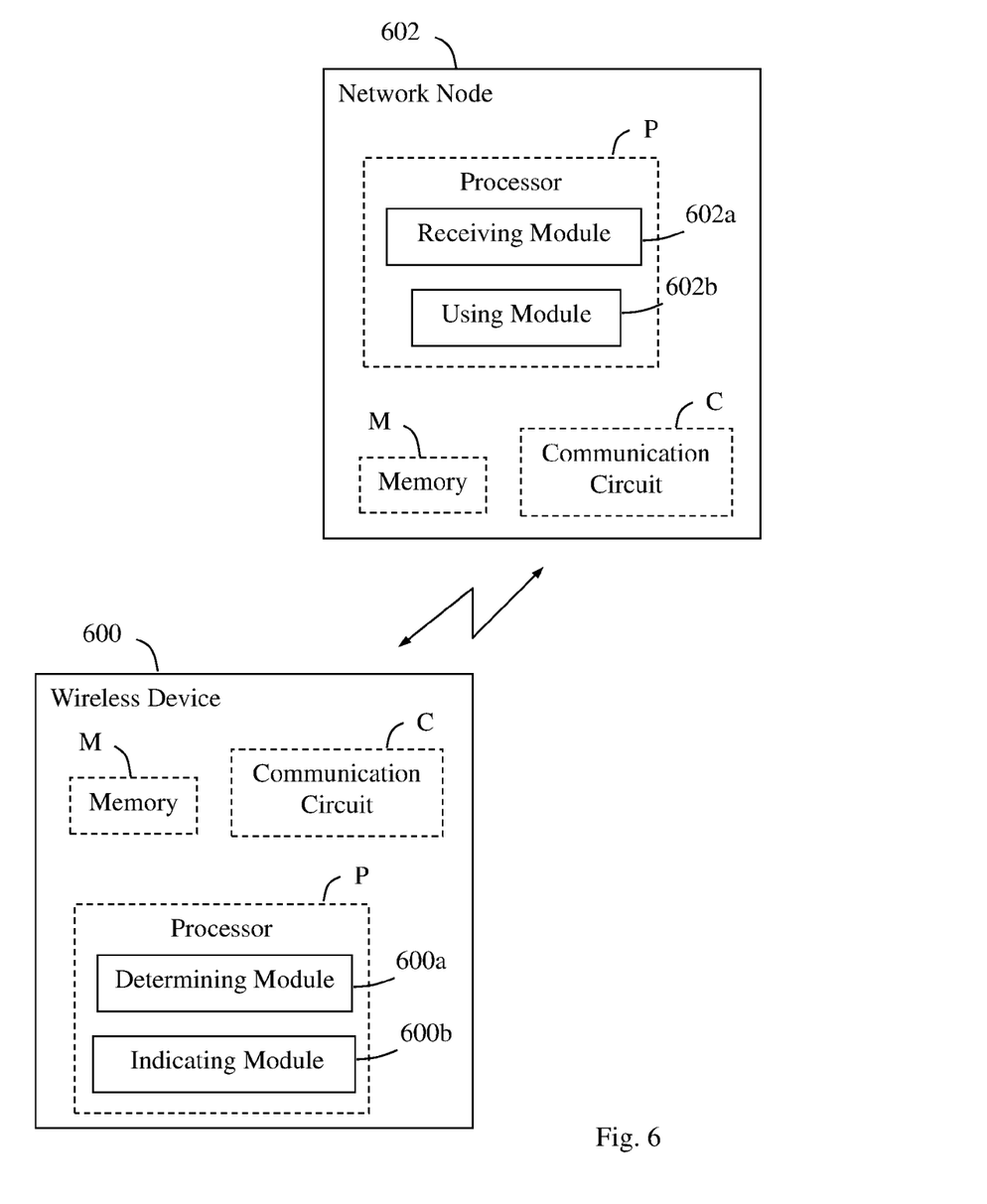
FIG. 6 is a block diagram illustrating a wireless device and a network node in more detail, according to further possible embodiments.

The block diagram in FIG. 6 illustrates a detailed but non-limiting example of how a wireless device 600 and a network node 602 may be structured to bring about the above-described solution and embodiments thereof. In this figure, the wireless device 600 and the network node 602 may be configured to operate according to any of the examples and embodiments of employing the solution as described above, where appropriate, and as follows. Each of the wireless device 600 and the network node 602 is shown to comprise a processor "P", a memory "M" and a communication circuit "C" with suitable equipment for transmitting and receiving signals with information in the manner described herein.

The wireless device 600 comprises means configured or arranged to perform at least some of the actions 400-404 of the flow chart in FIG. 4 in the manner described above, while the network node 602 comprises means configured or arranged to perform the actions 406-408 of the flow chart in FIG. 4 in the manner described above. These actions may be performed by means of functional modules in the respective processor P in the wireless device 600 and in the network node 602 as follows.

The wireless device 600 is capable of handling CSI measurements when operating in a wireless network in a TDD scenario where the network node 602 serving the wireless device 600 can switch between different uplink-downlink configurations comprising flexible subframes which can be uplink or downlink. The wireless device 600 comprises means configured to determine that a link direction of at least one of the flexible subframes is ambiguous, e.g. when the current uplink-downlink configuration has not been received according to the known pattern mentioned above. This activity may be performed by a determining module 600a in the wireless device 600, e.g. in the manner described for action 400 above.

The wireless device 600 also comprises means configured to indicate to the serving network node 602 that the wireless device 600 has not made a valid CSI measurement due to the ambiguous link direction. This indicating activity may be performed by an indicating module 600b in the wireless device 600, e.g. in the manner described for action 404 above.

The network node 602 is capable of handling CSI measurements by the wireless device 600 served by the network node 602 in a TDD scenario where the network node 602 can switch between different uplink-downlink configurations comprising flexible subframes which can be either uplink or downlink. The network node 602 comprises means configured to receive an indication from the wireless device 600 indicating that the wireless device 600 has not made a valid CSI measurement due to ambiguous link direction of at least one of the flexible subframes. This receiving activity may be performed by a receiving module 602a in the network node 602, e.g. in the manner described for action 406 above. As noted above, "receiving" an indication from the wireless device 600 may be done by just detecting that the wireless device 600 has not sent a CSI report as expected.

The network node 602 also comprises means configured to re-use a CSI measurement from a CSI report previously received from the wireless device 600. This re-using activity may be performed by a using module 602b in the network node 602, e.g. in the manner described for action 408 above.

It should be noted that FIG. 6 illustrates various functional modules in the wireless device 600 and the network node 602, respectively, and the skilled person is able to implement these functional modules in practice using suitable software and hardware. Thus, the solution is generally not limited to the shown structures of the wireless device 600 and the network node 602, and the functional modules 600a-b and 602a-b may be configured to operate according to any of the features described in this disclosure, where appropriate.

The functional modules 600a-b and 602a-b described above can be implemented in the wireless device 600 and in the network node 602, respectively, by means of program modules of a respective computer program comprising code means which, when run by the processor P in each node causes the wireless device 600 and the network node 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 600 and the network node 602 in the form of a memory having a computer readable medium and being connected to the processor P. The computer program product or memory M in each of the wireless device 600 and the network node 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 600 and network node 602.

The solution described herein may be implemented in each of the wireless device 600 and the network node 602 by a computer program comprising instructions which, when executed on at least one processor, cause the at least one processor to carry out the actions according to any of the above embodiments. The solution may also be implemented at each of the wireless device 600 and the network node 602 in a carrier containing the above computer program, wherein the carrier is one of an electronic signal, optical signal, radio signal, or computer readable storage medium.

It was mentioned above that the wireless device may indicate no valid CSI measurement to the serving network node when determining that a CSI Reference Signal is configured in a subframe with ambiguous link direction. An example of how this may be done will now be described with reference to the diagram in FIG. 7. This figure illustrates how the wireless device may determine whether there are any subframes with ambiguous link direction in which a CSI Reference Signal is configured.

Figure 7:
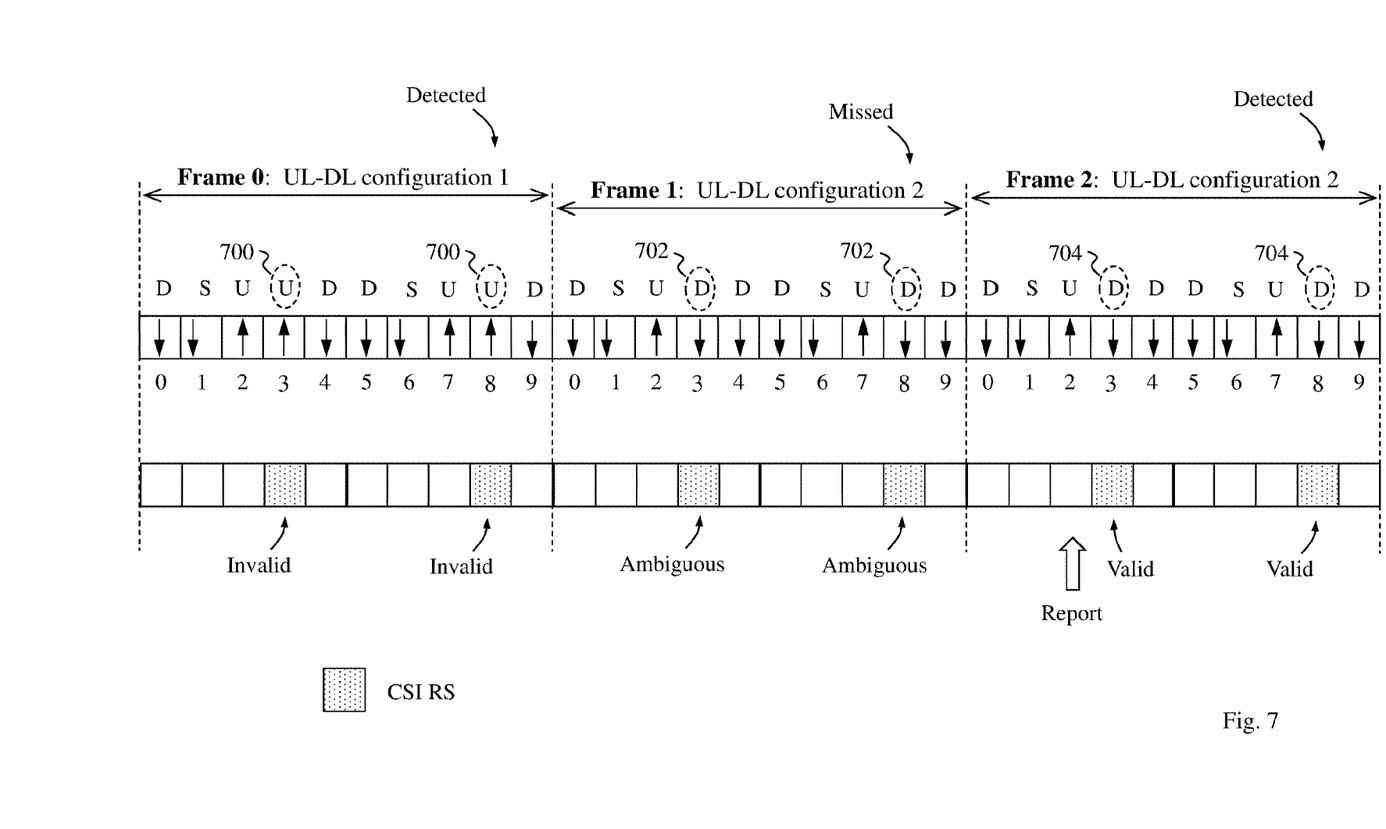
FIG. 7 is a diagram illustrating an example of how a wireless device may determine whether there are any subframes with ambiguous link direction, according to further possible embodiments.

Three successive radio frames 0, 1 and 2 are shown in FIG. 7, each comprising ten subframes 0-9. It is assumed that the wireless device has been informed that the CSI-RS is configured in subframes 3 and 8, as highlighted in the bottom row, which are flexible subframes according to the available uplink-downlink configurations shown in FIG. 1. In this example, the wireless device manages to detect a first uplink-downlink configuration denoted "UL-DL configuration 1" signaled by the network node for radio frame 0. According to this uplink-downlink configuration, subframes 3 and 8 are uplink subframes 700, and no CSI-RS are therefore transmitted in subframes 3 and 8 of radio frame 0. These subframes are therefore marked "invalid" in the figure. Consequently, no valid CSI-RS can be used for radio frame 0.

For the next radio frame 1, the wireless device is not able to detect a second uplink-downlink configuration signaled by the network node denoted "UL-DL configuration 2". Since the current uplink-downlink configuration was missed for radio frame 1, the wireless device determines that the flexible subframes 3 and 8 have ambiguous link direction 702 even though they are in fact downlink subframes according to UL-DL configuration 2. They are therefore marked "ambiguous" in the figure. Thus, no valid CSI-RS can be used for radio frame 1 by the wireless device either. The wireless device therefore indicates to the serving network node that it has not made a valid CSI measurement for radio frame 1 due to the ambiguous link direction, e.g. in the manner described for action 404 above. For example, the wireless device may indicate no valid CSI measurement for radio frame 1 to the serving network node by means of a CSI report to be sent in subframe 2 of the next radio frame 2, as indicated by the white arrow.

For the next radio frame 2, UL-DL configuration 2 is signaled by the network node which the wireless device manages to detect. According to this uplink-downlink configuration, subframes 3 and 8 are downlink subframes 704, thus being suitable for CSI measurement since the CSI-RS will be transmitted therein. They are therefore marked "valid" in the figure and the wireless device therefore performs CSI measurement in subframes 3 and 8 of radio frame 2 and sends a valid CSI report accordingly.

Another potential ambiguity is that the wireless device is not able to determine the CSI reference resource correctly if the uplink-downlink configuration is missed. For the purpose of deriving a CQI index correctly, the CSI reference resource must be the same for both the wireless device and the serving network node. As mentioned above, the CSI reference resource is defined by a single downlink subframe $n - n_{CQI\_ref}$, where n is reported uplink subframe, i.e. the subframe in which the device should send a CSI report, and $n_{CQI\_ref}$ is the smallest value greater than or equal to a predefined reference number, e.g., 4, such that it corresponds to a valid downlink subframe.

In radio frame 1, the wireless device does not know whether subframes 3 and 8 are downlink subframes or not due to the missed signaling of uplink-downlink configuration. If the wireless device assumes that the ambiguous subframes 3 and 8 in radio frame 1 are uplink subframes, as in the previous radio frame 0, it would find that the downlink subframe 5 of radio frame 1 is the CSI reference resource. On the other hand, the network node knows that subframes 3 and 8 are downlink subframes, and therefore subframe 8 will be regarded as the CSI reference resource by the network node. In this case, the determined CSI reference resource does not match between the network node and the wireless device.

It was also mentioned above that the serving network node may indicate subframes comprising a CSI Reference Signal and signal sets of CSI subframes which can be subjected to CSI measurement. An example of how this may be done will now be described with reference to the diagram in FIG. 8. This figure illustrates how the wireless device may determine whether there are any subframes with ambiguous link direction when the serving network node has signaled two sets of CSI subframes including a first set of CSI subframes denoted "CSI set 1" configured for CSI measurement in flexible subframes and a second set of CSI subframes denoted "CSI set 2" configured for CSI measurement in fixed subframes. The wireless device is required to send a separate CSI report for each of CSI set 1 and CSI set 2.

In FIG. 8, the network node again signals UL-DL configuration 1 for radio frame 0 which is detected by the wireless device, the network node signals UL-DL configuration 2 for radio frame 1 which is missed by the wireless device, and the network node signals UL-DL configuration 2 for radio frame 2 which is detected by the wireless device, just as in FIG. 7. The first set of CSI subframes indicates that CSI measurement is possible in the flexible subframes 3 and 8, while the second set of CSI subframes indicates that CSI measurement is possible in the fixed subframes 0, 1, 4, 5, 6 and 9. The CSI-RS transmitted in subframe 3 and 8 can be used for the CSI measurement of the first subframe set, and the CSI-RS transmitted in subframe 0 and 5 can be used for the CSI measurement of the second subframe set. However, the subframes 3 and 8 are flexible subframes 800 that can be either uplink or downlink depending on the current UL-DL configuration, while the subframes 0 and 5 are fixed subframes 802 that are always downlink for all UL-DL configurations, see also FIG. 2.

Figure 8:
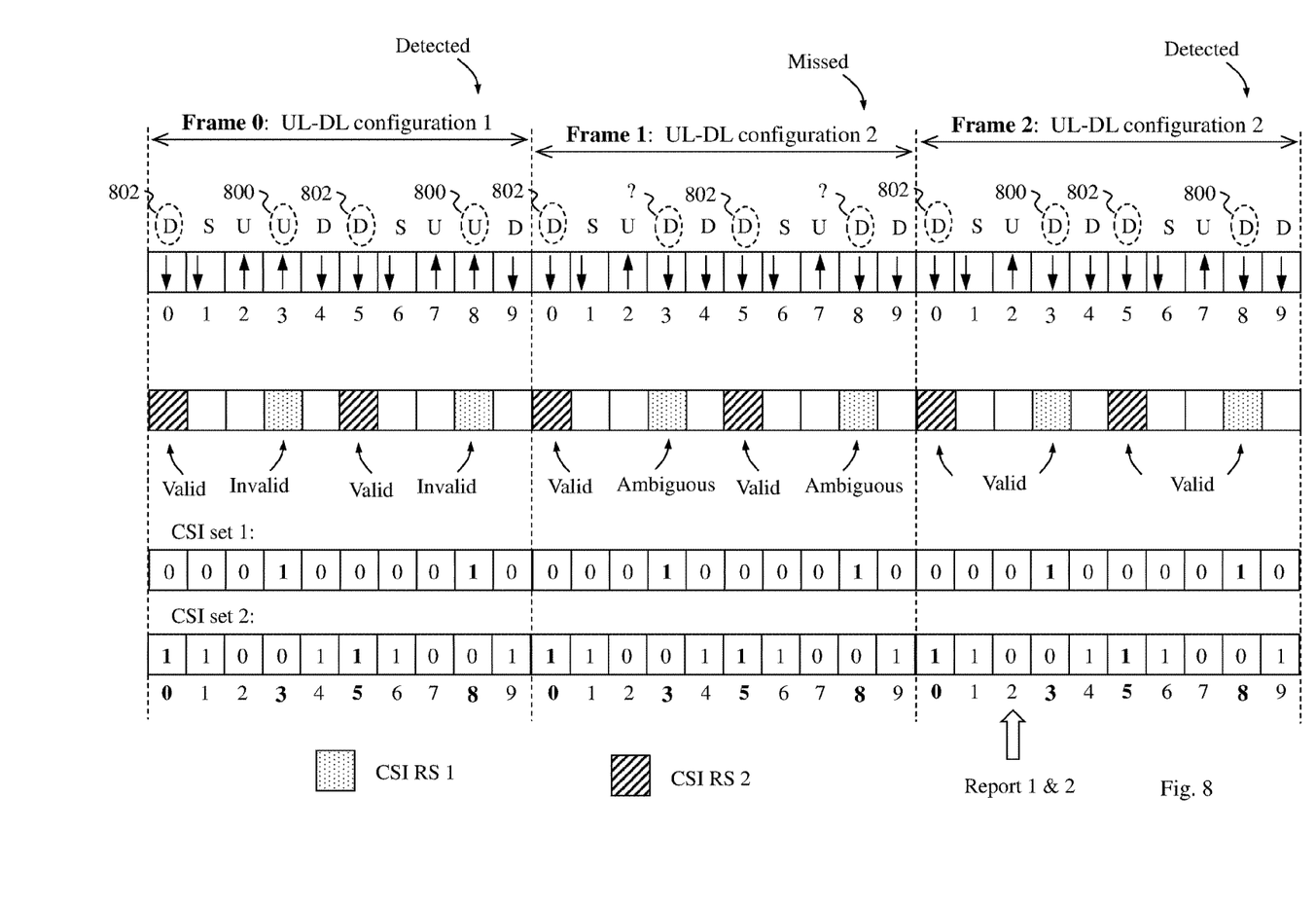
FIG. 8 is a diagram illustrating another example of how a wireless device may determine whether there are any subframes with ambiguous link direction, according to further possible embodiments.

Accordingly, the wireless device can use the fixed downlink subframes 0 and 5 of CSI set 2 for CSI measurement in radio frame 0, which are thus marked "valid", but not the uplink subframes 3 and 8 of CSI set 1, which are thus marked "invalid".

In the next radio frame 1, the wireless device can still use the downlink subframes 0 and 5 of CSI set 2 for CSI measurement since they are fixed subframes, which are thus marked "valid", even though the signaled uplink-downlink configuration was missed. On the other hand, the uplink subframes 3 and 8 of CSI set 1 are determined to have ambiguous link direction due to the missed uplink-downlink configuration signaling since they are flexible subframes, which are thus marked "ambiguous". The wireless device may indicate no valid CSI measurement for subframes 3 and 8 of CSI set 1 of radio frame 1 to the serving network node, e.g. by means of a CSI report for CSI set 1 to be sent in subframe 2 of the next radio frame 2, as indicated by the white arrow. The wireless device may also send valid CSI measurements for subframes 0 and 5 of CSI set 2 to the serving network node in a CSI report for CSI set 2 to be sent in subframe 2 of the next radio frame 2, as indicated by the white arrow.

In the next radio frame 2, all subframes 0, 3, 5 and 8 are downlink subframes according to UL-DL configuration 2 which has indeed been detected by the wireless device, and they are thus marked "valid", and the wireless device can perform CSI measurement and send CSI reports accordingly for both CSI set 1 and CSI set 2 in a following radio frame, not shown.

The ambiguity of the CSI reference resource described above for FIG. 7 may also occur in the case of FIG. 8, which will be described in more detail below with reference to "Example 2".

The solution will be further explained and described below, sometimes with reference to FIGS. 7 and 8. In this section, the term UE is used which is equivalent with the above-mentioned wireless device, and the term eNB is used which is equivalent with the above-mentioned network node.

In dynamic TDD, in case the explicit UL-DL configuration signaling is missed by the UE, there will be ambiguity for CSI-RS usage and determination of a so-called CSI reference resource. This disclosure is also valid for "CRS" in case CSI is measured based on CRS instead of CSI-RS. For simplicity, only CSI-RS will be mentioned hereinafter.

In the example of FIG. 7, for radio frame 0, TDD configuration 1 is signaled by the eNB in the explicit UL-DL configuration signaling. for radio frame 1 and radio frame 2, TDD configuration 2 is signaled by the eNB. As described above, the explicit UL-DL configuration signaling is correctly received and detected by the UE for frame 0 and frame 2, but for frame 1, the explicit UL-DL configuration signaling is missed by the UE. The CSI-RS is configured as shown in the bottom row of FIG. 7, where CSI-RS is transmitted in subframe 3 and subframe 8 for each radio frame. In radio frame 0 and radio frame 2, since the explicit UL-DL configuration is received correctly, the UE knows that the CSI-RS in subframes 3 & 8 of frame 0 is invalid since they are uplink subframes and the UE also knows that the CSI-RS in subframes 3 & 8 of frame 2 is valid since they are downlink. However, for the subframes 3 & 8 of frame 1, the link direction is ambiguous for the UE since it does not know if they are valid downlink subframes or not. Hence, the UE does not know whether this CSI-RS is transmitted or not and further does not know whether the CSI-RS in those subframes can be utilized for CSI measurement or not.

Furthermore, there will be ambiguity for CSI reference resource determination in case the explicit UL-DL configuration signaling is missed by the UE. For the purpose of deriving a CQI value, the CSI reference resource shall be clear both for the UE and for the serving eNB. The CSI reference resource is defined by a single downlink subframe $n-n_{CQI\_ref}$, where n is reported uplink subframe and $n_{CQI\_ref}$ is the smallest value greater than or equal to a predefined reference number, e.g., 4, such that it corresponds to a valid downlink subframe. In radio frame 1, the UE does not know whether subframe 3 and 8 are valid downlink subframes or not. If the UE assumes that such an ambiguous subframe is an uplink subframe, the downlink subframe 5 of radio frame 1 will be regarded as the CSI reference resource from the UE's perspective. But from the eNB's perspective, subframe 8 will be regarded as the CSI reference resource. In this case, the determined CSI reference resource does not match between the eNB and the UE.

Due to the ambiguous CSI-RS usage and misinterpretation of the CSI reference resource, the CSI feedback is not so useful for this scenario for these related subframes. In this case, it is more valuable to feedback a "predefined state" from the UE to the eNB in the CSI report to let the eNB know that the explicit UL-DL configuration signaling has been missed by the UE. Some examples of how the UE can notify the eNB about missed UL-DL configuration signaling have been described above. The predefined state may be Discontinuous Transmission, DTX, or a special predefined state, e.g. CQI index 0. DTX may be used when the feedback from the UE is carried on the Physical Uplink Control Channel, PUCCH, and a special predefined state such as CQI index 0 may be used when the feedback from the UE is carried on the Physical Uplink Shared Channel, PUSCH. In case DTX is used, the UE does not send a CSI report in the related CSI reporting subframe.

For the CSI-RS configured in a subframe with ambiguous link direction, the UE may skip or drop the CSI measurement in this subframe to avoid feedback of an irrelevant CSI report.

The above-mentioned predefined state of the UE may be triggered according to the following algorithm with four conditions 1-4:

The UE misses the explicit UL-DL configuration signaling (Condition 1), and

There exists a subframe with ambiguous link direction within the subframe subset corresponding to the CSI report (Condition 2), and The ambiguous link direction of the subframe leads to different understanding of the CSI reference resource for the UE and for the eNB (Condition 3), or Possible wrong CSI-RS usage (Condition 4).

The effect of this algorithm is the greatest when all four conditions above are fulfilled. However, the algorithm may also be triggered when only condition 1 is fulfilled or when only condition 1 and 2 or only condition 1, 2 and 3 are fulfilled.

EXAMPLE 1

In this case, a single CSI subframe set is configured, as shown in FIG. 7, and the predefined reference number is 4.

The subframes of a subframe set share one CSI report. Reference number 4 means that subframe n−4 is used to derive CQI. Reference number 4 is only used as an example herein. As shown in FIG. 7, for CSI report in subframe 2 of frame 2, indicated by the white arrow, between the reported uplink subframe n and the subframe n-n$_{CQI\_ref}$, there is one subframe, in this case subframe 8, with ambiguous link direction since the explicit UL-DL configuration signaling is missed by the UE. In this case, all the above mentioned conditions are satisfied, hence, the UE can transmit the above predefined state to the eNB to inform the eNB about the missing of explicit UL-DL configuration signaling.

EXAMPLE 2

In this case, two CSI subframe sets are configured, as shown in FIG. 8, and the predefined reference number is 4.

In dynamic TDD, the subframes are classified into two types of subframes, fixed subframes and flexible subframes as described above. Fixed subframes are the subframes whose link directions are the same in all uplink-downlink configurations in the broadcasted SIB and the TDD configuration in dedicated RRC signaling. Flexible subframes are the subframes whose link direction may be different between the TDD configuration in SIB and the TDD configuration in dedicated RRC signaling. In this example, two CSI sets are configured, one CSI set, CSI set 1, is used for CSI measurement of flexible subframes, and the second CSI set, CSI set 2, is used for CSI measurement of fixed subframes, as shown in FIG. 2. In two bottom rows in the figure, '1' denotes the subframes belonging to the CSI set, otherwise, the subframes denoted "0" do not belong to the CSI set. For each CSI subframe set, a separate report is required. Report 1 and report 2 are corresponding to CSI report for CSI subframe set 1 and CSI subframe set 2, respectively.

Each CSI reference resource belongs to either CSI subframe set 1 or CSI subframe set 2, but not to both. According to the definition of CSI reference resource, in case there is no missed detection of explicit UL-DL configuration signaling, for CSI subframe set 1 of report 1, subframe 8 is the subframe n-n$_{CQI\_ref}$. For CSI subframe set 2 of report 2, subframe 6 is the subframe n-n$_{CQI\_ref}$. Hence, for report 1, subframe 8 will be taken as the CSI reference resource, and for report 2, subframe 6 will be taken as the CSI reference resource.

Further, two sets of CSI-RS are configured as shown in FIG. 8, CSI set 1 and CSI set 2. One set, CSI set 1, is used for CSI subframe set 1 measurements and the other set, CSI set 2, is used for CSI subframe set 2 measurements. It is not specified how to utilize the CSI-RS. In general, the UE may utilize the most recently received CSI-RS for making CSI measurements. In this example, if no explicit UL-DL configuration signaling was missed by the UE, the CSI-RS in subframe 8 is the most recently received CSI-RS in CSI set 1 and CSI-RS in subframe 0 is the most recently received CSI-RS in CSI subframe set 2. Therefore, for report 1, UE will use CSI-RS in subframe 8 to measure the CSI for CSI subframe set 1. For report 2, UE will use CSI-RS in subframe 0 to measure the CSI for CSI subframe set 2.

In case there is missed detection of explicit UL-DL configuration signaling in frame 1, within the subframe subset CSI set 1 linked to the CSI report 1, there exists one subframe, subframe 8, whose link direction is ambiguous for the UE. With this ambiguity, the UE may have a different understanding of CSI reference resource than the eNB. In subframe 8, the wrong justification about the link direction will possibly lead to incorrect CSI-RS usage. In other words, all the four conditions described above are satisfied for the report 1. Therefore, the predefined state shall be triggered for report 1.

On the other hand, within the CSI subframe set CSI set 2 linked to the CSI report 2, there does not exist any subframe whose link direction is ambiguous for the UE, even though the explicit UL-DL configuration signaling has been missed by the UE. Since the link direction for all the subframes within the subframe subset linked to the CSI report 2 are clear for the UE, it will use the same CSI reference resource for CSI derivation as the eNB and it is not likely to have misbehavior for CSI-RS usage. Therefore, for CSI report 2, normal CSI feedback may be performed by the UE even though explicit UL-DL configuration signaling has been missed.

To simplify the CSI feedback design, there may be some alternatives for the conditions. As one alternative, any one condition can trigger the above UE behavior. As another alternative, any combination of the above conditions can be used to trigger the above UE behavior.

While the solution has been described with reference to specific exemplifying embodiments, the description is generally only intended to illustrate the inventive concept and should not be taken as limiting the scope of the solution. For example, the terms "wireless device", "network node", "uplink-downlink configuration", "Channel State Information, CSI" and "CSI Reference Signal, RS" have been used throughout this disclosure, although any other corresponding entities, functions, and/or parameters could also be used having the features and characteristics described here. The solution is defined by the appended claims.

ABBREVIATIONS

LTE Long Term Evolution
TDD Time Domain Duplex
PDCCH Physical Downlink Control Channel
ePDCCH enhanced PDCCH
UL Uplink
DL Downlink
CSI Channel State Information
CSI-RS CSI Reference Signal
CQI Channel Quality Information
3GPP 3rd Generation Partnership Project
Tx Transmission
Rx Receiving
PHICH Physical Hybrid ARQ Indicator Channel
SIB System Information Block
UE User Equipment
eNB E-UTRAN NodeB

The invention claimed is:

1. A method performed by a wireless device for handling Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the method comprising:
   determining that a link direction of at least one of the flexible subframes is ambiguous; and
   indicating to the serving network node that the wireless device has not made a valid CSI measurement due to the ambiguous link direction;
   wherein the wireless device determines that the link direction is ambiguous link direction in response to missing a current uplink-downlink configuration signaled by the serving network node; and
   wherein the current uplink-downlink configuration is signaled by the serving network node in group common explicit signaling, and wherein the wireless device determines that the link direction is ambiguous in response to missing the group common explicit signaling.

2. The method according to claim 1, wherein the wireless device drops or skips CSI measurement on a CSI reference signal, CSI-RS, configured in the at least one subframe with ambiguous link direction.

3. The method according to claim 1, wherein the wireless device indicates no valid CSI measurement by not reporting any measurement in a CSI reporting subframe corresponding to the at least one related subframe with ambiguous link direction to the serving network node.

4. A method performed by a wireless device for handling Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the method comprising:
determining that a link direction of at least one of the flexible subframes is ambiguous; and
indicating to the serving network node that the wireless device has not made a valid CSI measurement due to the ambiguous link direction;
wherein the wireless device indicates no valid CSI measurement by reporting a specific Channel Quality Information, CQI, value in a CSI reporting subframe; and
wherein the specific CQI value is a predefined CQI index.

5. A method performed by a wireless device for handling Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the method comprising:
determining that a link direction of at least one of the flexible subframes is ambiguous; and
indicating to the serving network node that the wireless device has not made a valid CSI measurement due to the ambiguous link direction;
wherein the wireless device indicates no valid CSI measurement to the serving network node in response to determining that a CSI Reference Signal, RS, is configured in the at least one subframe with ambiguous link direction and/or in response to determining that a CSI reference resource is ambiguous due to the ambiguous link direction of at least one of the flexible subframes; and
wherein a first set of CSI subframes is configured for CSI measurement in flexible subframes and a second set of CSI subframes is configured for CSI measurement in fixed subframes, and wherein the wireless device indicates no valid CSI measurement for the first set of CSI subframes to the serving network node and sends a CSI report of CSI measurement for the second set of CSI subframes to the serving network node.

6. A wireless device configured to perform Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the wireless device comprising:
a communication circuit configured to communicate with the serving network node; and
a processing circuit operatively associated with the communication circuit and configured to:
determine that a link direction of at least one of the flexible subframes is ambiguous, and
indicate to the serving network node that the wireless device has not made a valid CSI measurement due to the ambiguous link direction;
wherein the processing circuit is configured to determine that the link direction is ambiguous in response to missing a current uplink-downlink configuration signaled by the serving network node; and
wherein the current uplink-downlink configuration is signaled by the serving network node in group common explicit signaling, and wherein the processing circuit is configured to determine that the link direction is ambiguous in response to missing the group common explicit signaling.

7. The wireless device according to claim 6, wherein the processing circuit is configured to drop or skip CSI measurement on a CSI reference signal, CSI-RS, configured in the at least one subframe with ambiguous link direction.

8. The wireless device according to claim 6, wherein the processing circuit is configured to indicate no valid CSI measurement by not reporting any measurement in a CSI reporting subframe corresponding to the at least one related subframe with ambiguous link direction to the serving network node.

9. A wireless device configured to perform Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the wireless device comprising:
a communication circuit configured to communicate with the serving network node; and
a processing circuit operatively associated with the communication circuit and configured to:
determine that a link direction of at least one of the flexible subframes is ambiguous, and
indicate to the serving network node that the wireless device has not made a valid CSI measurement due to the ambiguous link direction;
wherein the processing circuit is configured to indicate no valid CSI measurement by reporting a specific Channel Quality Information, CQI, value in a CSI reporting subframe; and
wherein the specific CQI value is a predefined CQI index.

10. A wireless device configured to perform Channel State Information, CSI, measurements when operating in a wireless network in a dynamic Time Division Duplex, TDD, scenario where a network node serving the wireless device can switch between different uplink-downlink configurations comprising flexible subframes which can be uplink or downlink, the wireless device comprising:
a communication circuit configured to communicate with the serving network node; and
a processing circuit operatively associated with the communication circuit and configured to:
determine that a link direction of at least one of the flexible subframes is ambiguous, and
indicate to the serving network node that the wireless device has not made a valid CSI measurement due to the ambiguous link direction;
wherein the processing circuit configured to indicate no valid CSI measurement to the serving network node in response to determining that a CSI Reference Signal, RS, is configured in the at least one subframe with ambiguous link direction and/or in response to determining that a CSI reference resource is ambiguous due to the ambiguous link direction of at least one of the flexible subframes; and wherein a first set of CSI subframes is configured for CSI measurement in flexible subframes and a second set of CSI subframes is configured for CSI measurement in fixed subframes, and wherein the processing circuit is configured to indicate no valid CSI measurement in the first set of CSI subframes to the serving network node and to send a CSI report of CSI measurement in the second set of CSI subframes to the serving network node.

* * * * *